United States Patent
Cowan et al.

(10) Patent No.: US 6,676,075 B2
(45) Date of Patent: Jan. 13, 2004

(54) AIRPLANE HARD LANDING INDICATION SYSTEM

(75) Inventors: Samuel J. Cowan, Los Angeles, CA (US); Ronald L. Cox, Long Beach, CA (US); Harry W. Slusher, Fountain Valley, CA (US); Sunil Jinadasa, Long Beach, CA (US)

(73) Assignee: The Boeing Company, Seattle, WA (US)

( * ) Notice: Subject to any disclaimer, the term of this patent is extended or adjusted under 35 U.S.C. 154(b) by 0 days.

(21) Appl. No.: 09/943,539

(22) Filed: Aug. 30, 2001

(65) Prior Publication Data

US 2003/0042354 A1 Mar. 6, 2003

(51) Int. Cl.$^7$ ............................................... B64C 25/02
(52) U.S. Cl. .................... 244/100 R; 244/1 R
(58) Field of Search ................. 244/100 R, 1 R, 244/117 R; 73/802, 11.07

(56) References Cited

U.S. PATENT DOCUMENTS

| | | | | |
|---|---|---|---|---|
| 2,722,587 A | * | 11/1955 | Buzzetti et al. | 244/100 R |
| 4,278,219 A | * | 7/1981 | Finance | 116/203 |
| 4,312,042 A | * | 1/1982 | Bateman | 177/136 |
| 4,336,595 A | * | 6/1982 | Adams et al. | 377/19 |
| 4,850,552 A | * | 7/1989 | Darden et al. | 244/1 R |
| 5,511,430 A | * | 4/1996 | Delest et al. | 73/802 |
| 5,955,972 A | * | 9/1999 | Wade | 244/100 R |
| 6,354,152 B1 | * | 3/2002 | Herlik | 73/597 |

FOREIGN PATENT DOCUMENTS

JP           404201696    *  7/1992   ................. 244/1 R

* cited by examiner

Primary Examiner—Peter M. Poon
Assistant Examiner—Timothy D. Collins
(74) Attorney, Agent, or Firm—Conrad O. Gardner

(57) ABSTRACT

This invention relates to a hard landing indication system that will provide a quantitative assessment that a hard landing did or did not occur at the last landing of an airplane. A hard landing can cause structural damage to an airplane. An airplane that has been declared to have a hard landing must be grounded until an inspection of the structure has been made to determine if repairs are required.

4 Claims, 4 Drawing Sheets

AIRPLANE HARD LANDING INDICATION SYSTEM

BACKGROUND OF THE INVENTION

This invention relates to aircraft landing systems and more particularly to a method and apparatus for determining whether a hard landing has occurred, assisting in determining whether further inspection for structural damage is necessary.

PROBLEM SOLVED BY THE INVENTION

The current process for deciding that a "hard landing" has occurred is based on a subjective assessment by the flight crew. Because of the lack of reliable quantitative data, errors are made in this assessment. As a result, an airplane may be grounded unnecessarily, at a considerable cost of time and money, or conversely, a damaged airplane can continue in service. This invention will provide quantitative data that will assist in determining if a structural inspection is required.

BACKGROUND AND OBJECTS OF THE INVENTION

The technical literature regarding methods for determining hard landings can be divided into two classes. The first, and most often cited method is to utilize kinetic measurements (acceleration, velocity or displacement indications). The second method is to utilize force measurements (pressure or stress/strain indications). Only the second method of measurement addresses the physical phenomena causing the structure to fail.

Attempts to utilize kinetic measurements (airplane vertical deceleration or sink rate, for example) have failed because the kinetic conditions are only ancillary to parameters and not the cause of the structural damage. The dynamics that occur in a hard landing are very complex. Forces are applied to the airplane structure from a multitude of causes. Examples of these causes include arresting the vertical decent of the airplane, wing lift at touchdown less than the weight of the airplane, momentum of the airplane about its roll axis, spin up of the wheels and tires with the associated spring back and side forces due to airplane yaw at touchdown. An accelerometer or other kinetic instrument will not measure the effect of many of these forces. Recent accident investigations have shown that flight data recorder information did not show that a hard landing occurred, (using the conventional ten feet per second sink rate criteria) even though the airplane impacted the ground with a force that caused structural failure.

An object of this invention is to avoid the problems the kinetic measurements have by measuring the stress/strain occurring in critical elements of the structure. These measurements are independent of the cause of the forces, they indicate actual stress/strain being applied to the structure. It is the stress/strain in the structure that can cause it to suffer damage.

DETAILED DESCRIPTION OF THE INVENTION

Figure 1:
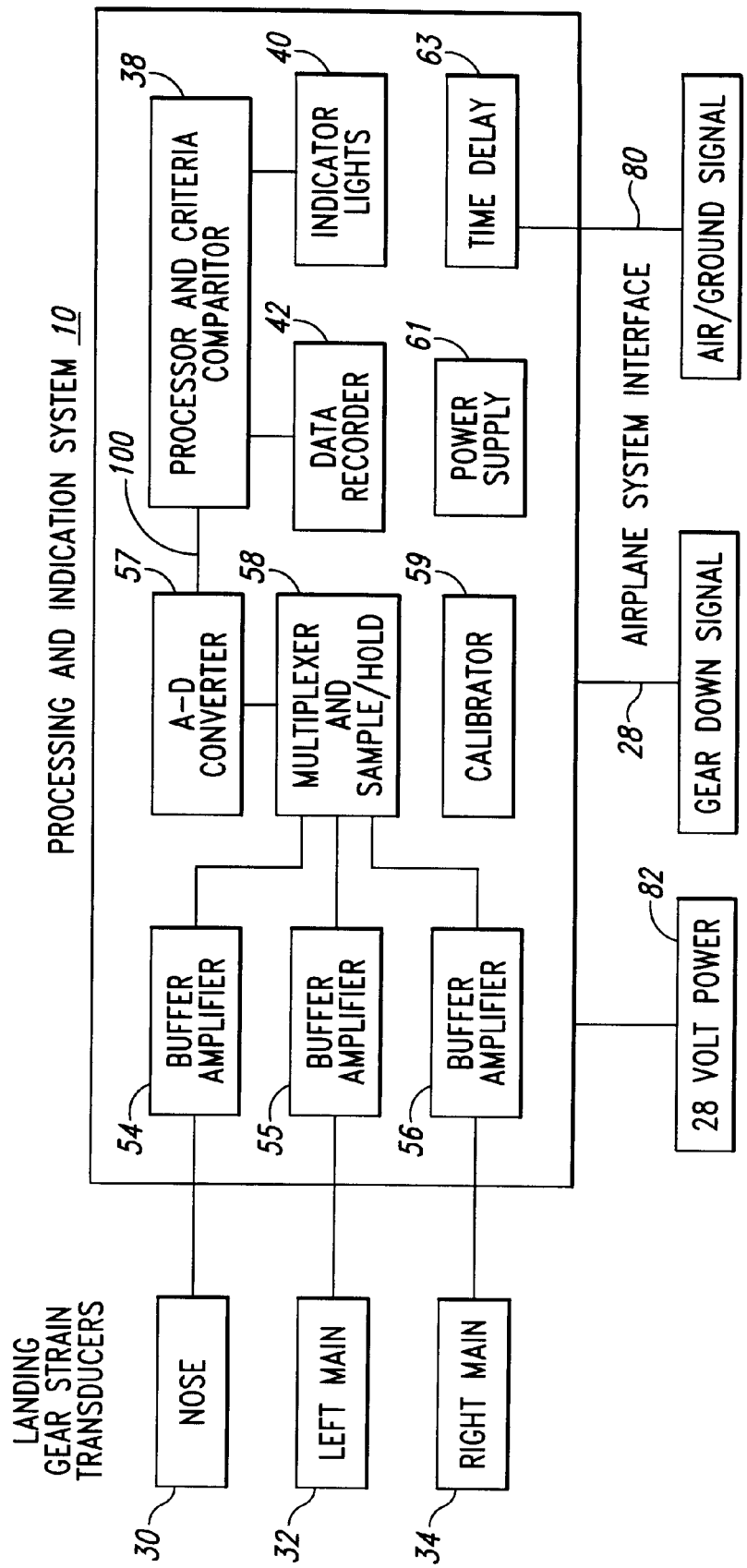
FIG. 1 is a block diagram of the present processing and indication system according to an embodiment of the invention.
Figure 2A:
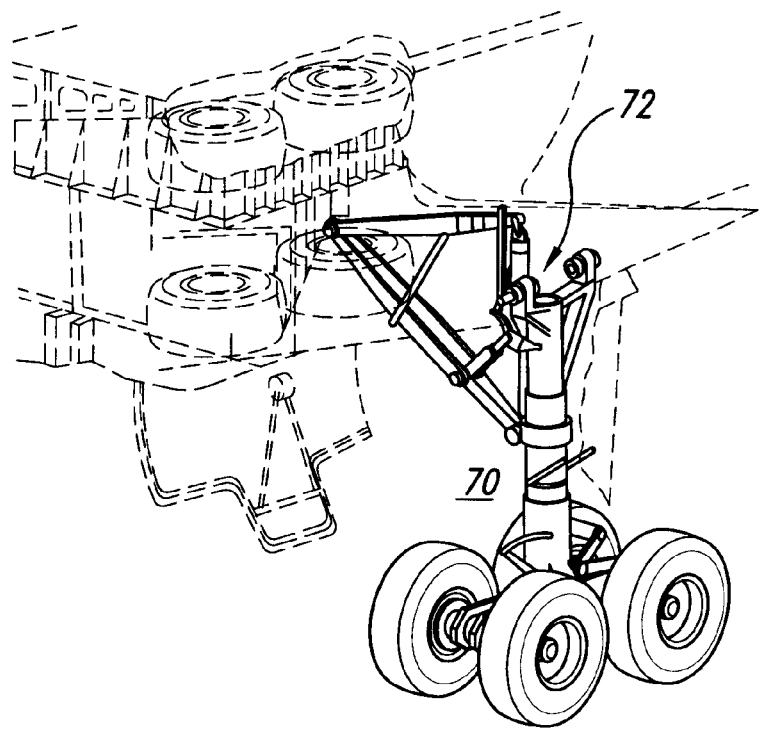
FIGS. 2A and 2B are an exemplary positioning of strain gauge transducer utilizing trunion bolt positioning on the main landing gear of the airplane.
Figure 2B:
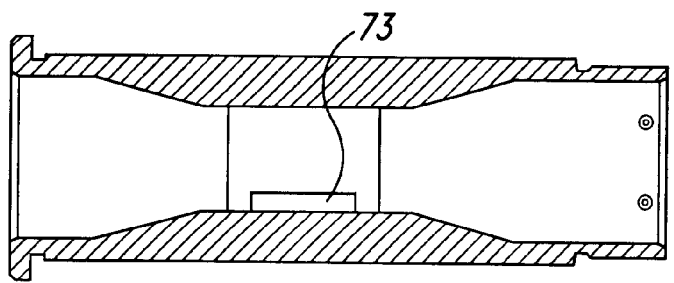

This invention provides a quantitative measure of forces that can cause structural damage to an airplane that has had a "hard landing" event. The purpose of the invention is to provide information needed to make the decision that the airplane requires a "hard landing inspection" before it is dispatched for the next flight.

The fundamental principles of the invention are that during a "hard landing event" the airplane structure can be damaged due to forces resulting from the contact of the airplane wheel(s) with the ground. These forces are transmitted through the structure due to the physical contact of airplane components. If the forces are of sufficient magnitude, they will exceed the capability of the structure to sustain them without damage, and a structural failure occurs. Due to the complexity of an airplane structure, it is difficult to determine exactly where the failure will occur. As a result, an airplane's maintenance manual contains information on where to inspect the airplane for possible damage if a hard landing occurs.

This invention performs a measurement of the force by means of the deformation of a part of the structure that is in the direct load path of the forces that are a result of the "hard landing". This deformation is determined by the use of strain measuring transducers. Typical strain transducers are called strain gauges (resistance type or piezoelectric type), reluctance gauges (electromagnetic inductance type) or capacitance gauges. In the application of this invention, any type of strain measuring transducer that provides an electrical signal as its output is applicable.

The location of the transducers on the structure is critical. The transducers must be placed where the forces due to the hard landing pass directly and simply through a structural member of the airplane. Some example locations are shown in FIGS. 2–6, but other locations are possible and would achieve the objectives of the present invention. Since each airplane type has a unique design of its landing gear and associated structure, it follows that an engineering study of the design must be made to properly locate the transducers. For example, tricycle-type landing gears, transducers are placed to measure the forces from the main landing gears and the nose landing gear, as seen in the block diagram of FIG. 1. The electrical signals from each strain transducer are sent to a data measuring, processing, recording and indicating unit. This processing and indication system 10 can be placed in the flight deck of the airplane, or other accessible location. This unit is shown in the block diagram o f FIG. 1. Utilizing available solid state electronic technology, the present processing and indication system 10 can be quite small. The system can be sized for any number of transducer inputs.

The operation of the present processing and indication system is as follows: The recording system is activated (turned on) by a signal 28 that the landing gear has been lowered, or any other indication that landing is imminent. The amplified electrical analog signal from each transducer 30, 32, and 34 is processed and the digital signals are passed to the processor and criteria comparator 38. The signals are compared to the load criteria level that has been programmed into the unit. If a signal exceeds its criteria, the processor illuminates the indicator light 40 for the appropriate landing gear. The data is also sent to data recorder 42 as a record of the event. During the time the recording unit is enabled, it is recording all the data from the processor. This provides a time history of the landing event. The recording system is turned off by a delayed signal that the airplane is on the ground. If desired, the recording could be continued until the airplane is shut down at the gate.

Upon completion of a landing and during shut down of the airplane, the crew will check the lights 40 on processor unit 10 to see if there was an exceedence of the maximum load criteria. If an exceedence is indicated, a hard landing event has occurred and the airplane needs to be removed from service and inspected for damage. The time history of the event is recorded on data recorder 42. The data can be downloaded for further analysis. If no exceedence is indicated, the processing system will record the data from the next landing by overwriting the old data.

DETAILED DESCRIPTION OF A PREFERRED EMBODIMENT

The present processing and indicating system 10 can be sized for any number of transducer inputs, the exemplary embodiment described hereinafter and shown in FIG. 1 comprises an example of a three-transducer system.

The processing and indication system 10 for indicating hard landings comprises the following components as shown in FIG. 1. Components 54, 55 and 56 are buffer amplifiers, one for each of strain transducers 30, 32 and 34. Component 58 is a multiplexer and sample/hold device. Component 57 is an analog to digital (A–D) converter. Component 38 is a processor and criteria comparator computing unit. Component 42 is a data recorder which records the data and also stores the programming for the processor and criteria comparator 38. Component 40 is a set of indicator lights, one for each landing gear, that shows if the force criteria has been exceeded, and a light indicating that the system has been calibrated and is functional. Component 59 is a calibrator that checks the system for functionality before each use. Component 61 is a power supply for strain transducers 30, 32 and 34 and the entire processing system. Component 63 is a time delay unit which turns the recording system off at an appropriate time after air ground signal 80 signals that the airplane is on the ground. Component 82 is the source of power for the system. Component 28 is the gear down signal that turns processor system recorder 42 on. Components 30, 32 and 34 are the strain transducers mounted on structure in the hard landing load path.

The operation of the processing and indication system 10 for indicating hard landings is as follows: The processing and indication unit 10 is turned on by signal 28 that the landing gear has been lowered. The amplified electrical analog signal from each of transducers 30, 32 and 34 is multiplexed and placed in a sample/hold memory 58 before it is digitized at approximately 1000 Hz. Digital signals 100 are passed to processor and criteria comparator 38. The signals are compared to the force criteria level that has been input to the unit. If a signal exceeds its criteria, the processor illuminates the indicator light for the appropriate landing gear. The data is also sent to data recorder 42 as a record of the event. During the time the recording unit is enabled, it is recording all the data from processor and criteria comparator 38. This provides a time history of the landing event. The recording system is turned off by a delayed signal 80 that the airplane is on the ground If desired, the recording could be continued until the airplane is shut down at the gate.

Upon completion of a landing, the crew will check lights 40 on the processing and indication system 10 to see if there was an exceedence of the maximum force criteria. If an exceedence is indicated, a hard landing event has occurred and the airplane needs to be removed from service and inspected for damage. The time history of the event is recorded on data recorder 42. The data can be downloaded for further analysis. If no exceedence is indicated, the processing system will record the data from the next landing by overwriting the old data.

FIGS. 2 through 6 illustrate example locations for the strain gauge transducers. FIG. 2A illustrated the main landing gear structure of a large commercial transport airplane. The strain transducers 73 of FIG. 2B are located in trunion bolts 72 (this is the linkage between the landing gear and the airplane structure that allows the main landing gear to pivot and retract into the wing and fuselage). Trunion bolts 72 are reliable structural members that react the full landing load and a location for hard landing load measurement transducers. When a hard landing occurs, a vertical force is transmitted through the trunion bolts 72 into the airplane structure. Bolts 72 are deflected (strained) in bending and transducer 73 measures this strain. The bolts are restrained from rotation so that the strain gauges are aligned so that the vertical component of the strain is always measured.

Figure 3:
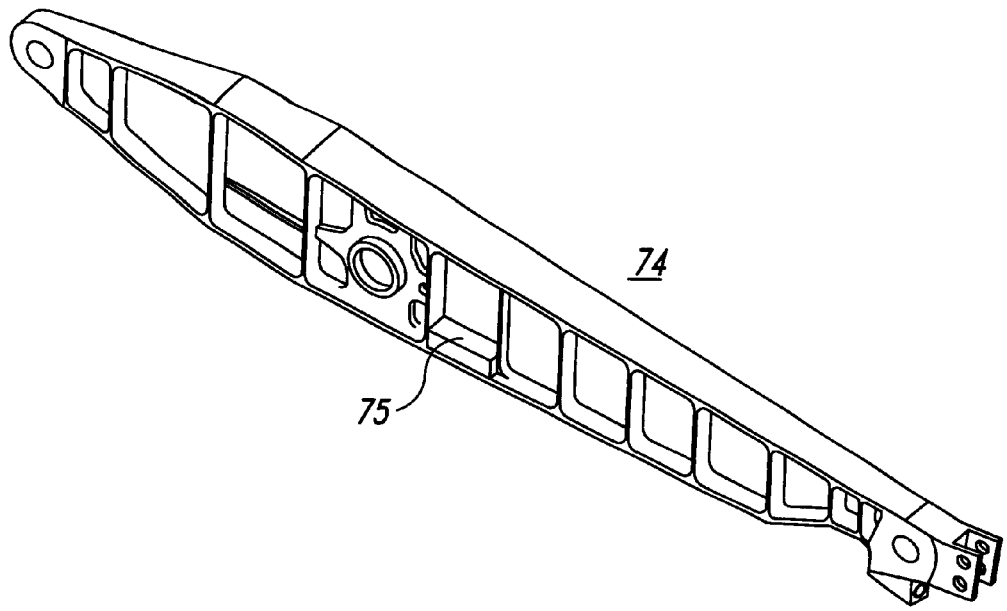
FIG. 3 shows strain gauge positioning on the landing gear beam of the airplane.

Another example of transducer placement is shown in FIG. 3. This figure shows a section of a landing gear beam 74 that supports part of the main landing gear of a large commercial airplane. The beam is deflected when a hard landing force is applied and the strain in the beam is measured as an indication of the magnitude of the hard landing force. Strain gauge transducer 75 is placed on a flange of the beam and measures the strain in the beam.

Figure 4:
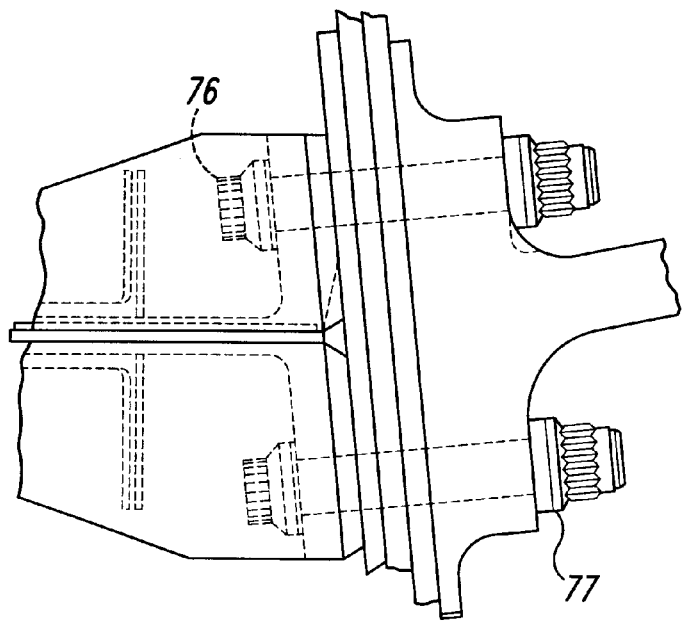
FIG. 4 is illustrative of a further exemplary positioning of the strain gauge transducer at landing gear support fitting attachment bolts.

A third example with two possible transducer types is shown in FIG. 4. This example places the transducer where the landing gear is bolted to the rear spar of the airplane wing or other airplane structure. One type of transducer installation is to place the strain gauge in a bolt 76 that is under tension during landing. Another type of transducer installation is to place a washer-type strain gauge 77 on the bolt in tension. This type of tension bolt is typically preloaded (to reduce fatigue) and the strain changes a small amount until the preload is exceeded. Thus during normal operation the strain in bolt 76 will remain almost constant and only with the application of an excessive force such as a hard landing, will there be a significant change.

Figure 5:
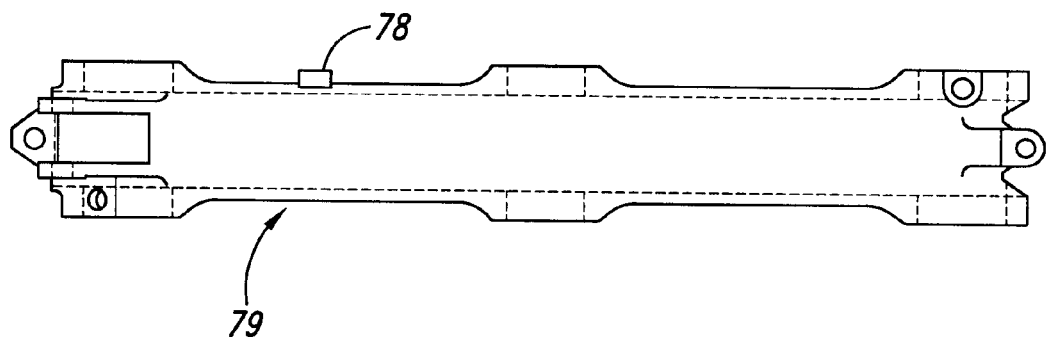
FIG. 5 is illustrative of strain gauge transducer positioning in accordance with yet another location on the landing gear bogie beam; and, FIG. 6 shows a further optional positioning of strain gauge transducer mounted on a wing lower surface panel.

A fourth example of positioning is shown in FIG. 5. Strain gauge transducer 78 is placed on landing gear bogie beam 79 (used when there are more than two tires per landing gear). Beam 79 is strained in bending when the load of the landing occurs. Strain transducer 78 measures this strain and sends this information to flight deck processing and indication system 10. An onboard weight and balance system typically has this type of strain transducer. The signal from the transducer can provide the data for both systems.

Figure 6:
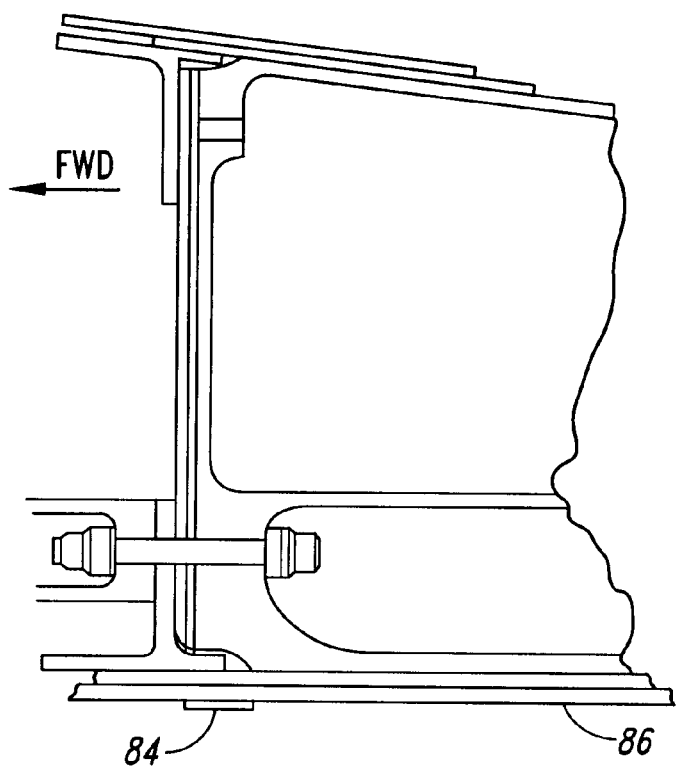

A fifth example is shown in FIG. 6. A strain gauge transducer 84 is placed on the lower wing skin 86 or doubler, which becomes part of the primary load path from the landing gear into the wing structure.

What is claimed is:

1. A method for operating a processing and indication system for indicating hard landings of an aircraft comprising:

turning on the processing and indicating system in response to a signal representative of lowering of the landing gear of the aircraft;

amplifying the electrical analog signal from a plurality of strain measuring transducers positioned on parts of the aircraft structure that are in direct load path of forces due to a hard landing;

multiplexing and placing the electrical analog signals from said plurality of strain measuring transducers in a sample/hold memory;

digitizing the signals in said sample/hold memory;

passing the digitized signals to a processor and criteria comparator; and, then illuminating an indicator light for a landing gear if a signal exceeds a criteria.

2. The method of claim 1 further comprising the step of recording all the data from said processor and criteria comparator in a data recorder to provide a time history of a landing event.

3. A method for determining hard landing load of an aircraft comprising:

positioning a plurality of strain gauge transducers in trunion bolts linking landing gear and aircraft structure;

causing deflection of said trunion bolts in a hard landing of the aircraft thereby measuring strain with said plurality of strain gauge transducers; and, restraining said trunion bolts from rotation thereby aligning said plurality of strain gauge transducers so that the vertical component of strain is measured.

4. A method for utilizing a strain gauge to measure hard landing of an aircraft comprising the steps of:

positioning said strain gauge and tension bolt in an aircraft structure that is in direct load path of forces due to a hard landing; and, then preloading said tension bolt thereby causing only excessive force of a hard landing to provide a significant change in strain in said bolt.

* * * * *